United States Patent [19]
Mueller

[11] 3,810,207
[45] May 7, 1974

[54] EXPOSURE CONTROL SYSTEM

[75] Inventor: Arthur C. Mueller, Niles, Ill.

[73] Assignee: Bell & Howell Company, Chicago, Ill.

[22] Filed: Apr. 24, 1972

[21] Appl. No.: 246,757

[52] U.S. Cl............. 95/64 R, 95/10 CD, 95/64 D, 352/141
[51] Int. Cl...... G03b 9/02, G03b 9/06, G03b 17/20
[58] Field of Search............ 95/64 R, 64 D, 10 CD; 352/141

[56] References Cited
UNITED STATES PATENTS

| | | | |
|---|---|---|---|
| 3,584,558 | 6/1971 | Easterly | 95/64 R |
| 3,665,826 | 5/1972 | Karpol | 95/10 CD |
| 3,651,748 | 3/1972 | Yoshiada | 95/64 R |
| 3,116,673 | 1/1964 | Bogopolsky | 95/64 D |
| 3,292,517 | 12/1966 | Eagle et al. | 95/64 D |
| 3,099,198 | 7/1963 | Mueller | 95/64 D |
| 2,297,262 | 9/1942 | Tonnies | 95/64 D |
| 3,183,808 | 5/1965 | Teshi et al. | 95/64 D |

Primary Examiner—Samuel S. Matthews
Assistant Examiner—Russell E. Adams, Jr.
Attorney, Agent, or Firm—Melvin F. Jager

[57] ABSTRACT

A system for controlling and indicating the exposure condition of film in a camera. The system includes indicia means signaling the existance of an underexposed or over-exposed condition and iris blade means and aperture control means which cooperate to expose the film in the camera during said underexposed or over-exposed conditions.

7 Claims, 5 Drawing Figures

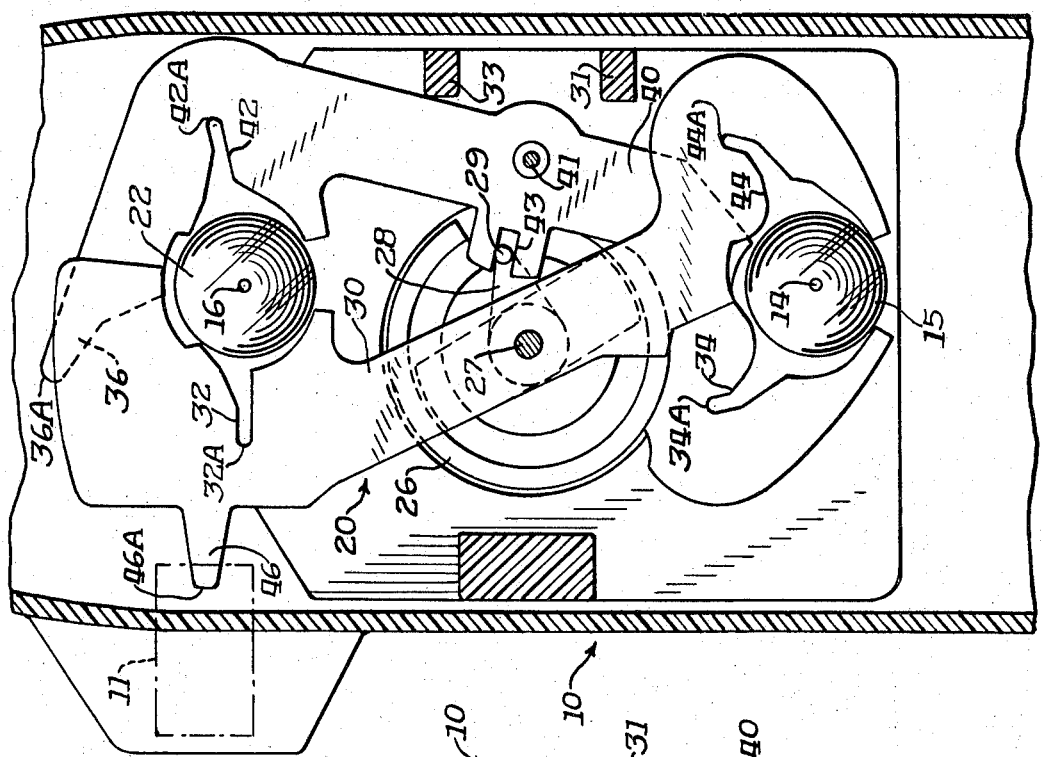
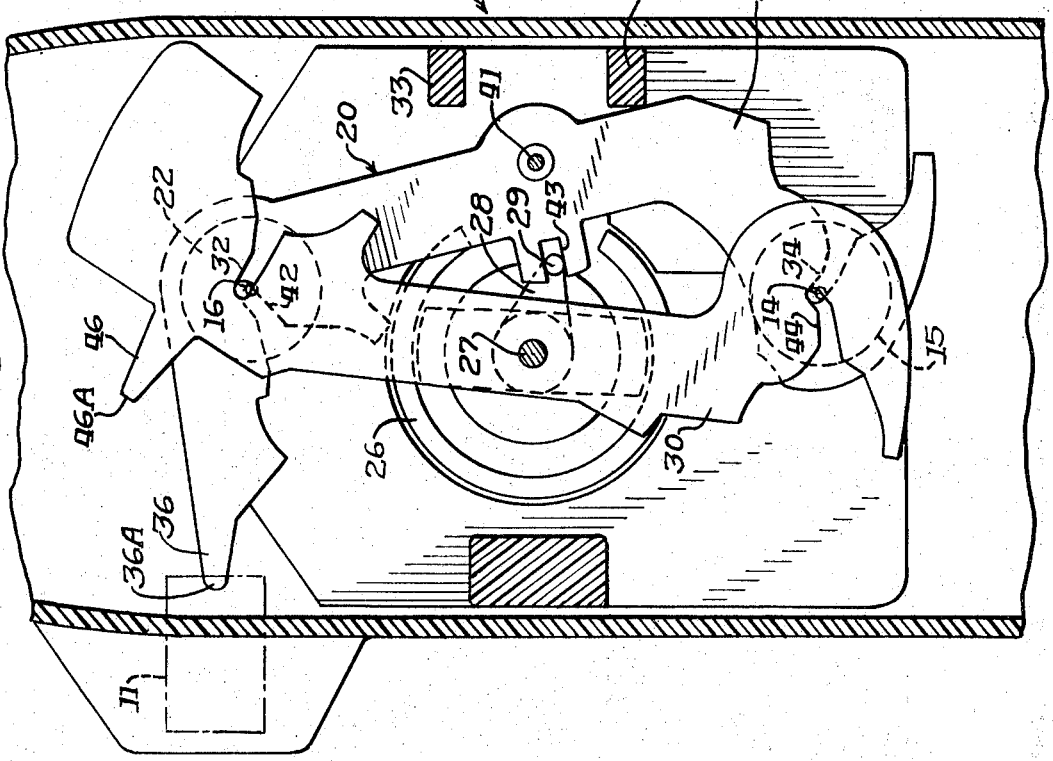

EXPOSURE CONTROL SYSTEM

BACKGROUND AND GENERAL DESCRIPTION OF THE INVENTION

This invention relates to a system for controlling and indicating the exposure condition of film in a photographic camera.

The exposure control system currently embodied in photographic cameras possess several disadvantages. A general disadvantage is that most systems are incapable of warning the camera user that an under-exposure or over-exposure condition exists without losing the ability to continue to take pictures under such extreme lighting conditions. The conventional approach for registering extreme lighting conditions has been to rely upon movement of an iris blade in the camera to cause some indicia means to register in the camera. Reliance upon iris blade movement to register an under-exposure condition is possible in conventional systems because the lens aperture is already opened to a maximum and hence would be unaffected by additional iris blade movement. However, heretofore, it has not been feasible to effectively utilize the movement of an iris blade to indicate an over-exposure condition without unduly restricting the aperture, with the attendant light diffraction problems, or without shutting the lens aperture completely and thus losing the ability to take pictures with the camera.

The foregoing problems are overcome by the present invention by providing an exposure control system for photographic cameras which permits pictures to be taken by the camera under extreme over-exposure and under-exposure lighting conditions. Simultaneously, the system operates to advise the camera user that the extreme lighting condition exists, and that the resultant pictures will likely be either under or over exposed. The camera user thus has the option to stop taking pictures, or to continue with the picture-taking process and thereby record scenes which would otherwise be lost.

Briefly described, the system for controlling and indicating exposure conditions of film in a photographic camera embodying the features of the present invention includes an exposure meter having light sensing means, such as a photocell, and drive means such as a galvanometer. The light sensing and drive means are coupled in a manner which moves the drive means in relation to the intensity of the light sensed in the field of view of the camera. A lens system defines an optical axis for the camera. Iris blade means are arranged to be driven across the optical axis between selected first and second positions. The blade means define an aperture means having a configuration which varies from a minimum to a maximum area so that the exposure of light to the lens system is varied as the blade moves between the first and second positions. The aperture means is also arranged to maintain the minimum and maximum exposure areas for the lens system as the meter drive moves the blade a predetermined distance beyond the established first and second positions. Further, suitable indicia means are coupled to the blade to register over-exposure indicia when the blade moves beyond the second position. The system embodying the features and advantages of the invention therefore permits exposure of the film through the lens system under extreme lighting conditions, while indicating the condition clearly to the camera user.

EXEMPLARY EMBODIMENT

Further objects and advantages of the present invention will become more apparent from a description of an embodiment thereof, taken in conjunction with the accompanying drawings. In the drawings:

FIG. 3 is a cross-sectional view of the exposure control system similar to FIG. 2, illustrating the system in an over-exposed condition;

FIG. 4 is a cross-sectional view of the exposure control system similar to FIGS. 2 and 3, illustrating the system in an under-exposed condition.

Figure 1:
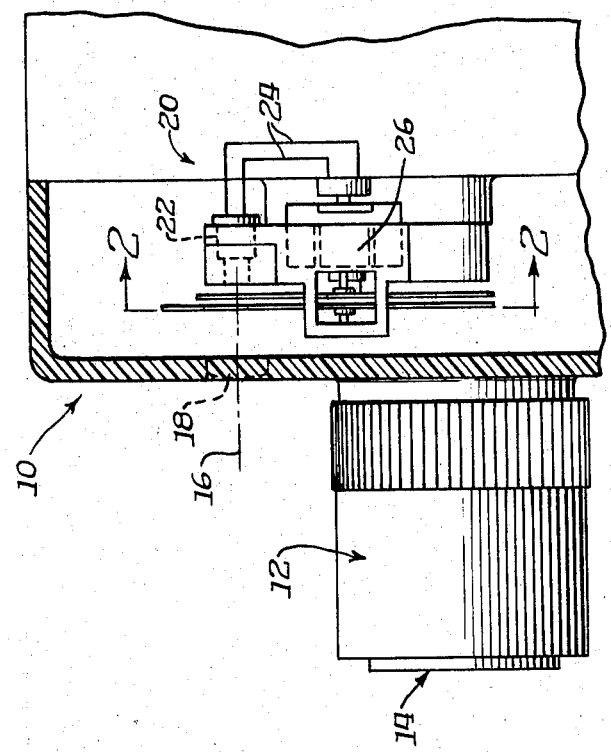
FIG. 1 is an elevational view, in partial section, of a camera embodying the exposure control system of the present invention.

Referring generally to the drawings, the camera incorporating the exposure control system of the present invention is generally indicated by the reference numeral 10. The camera 10 includes a view finder 11 and a fixed aperture 15. A lens assembly 12 defines an optical axis 14 for the camera. The axis 14 extends through the fixed aperture 15. The camera 10 also includes a photocell axis 16, and a photocell lens 18 arranged on that axis to permit light to be directed from the field of view into the interior of the camera. The exposure control system embodying the present invention is generally indicated by the reference numeral 20. The system 20, as indicated in FIG. 1, is arranged inside the camera 10 in alignment with both the lens axis 14 and the photocell axis 16.

The exposure control system 20 incorporates a variable resistance photocell 22 placed along the axis 16. The photocell 22 operates in a conventional manner to sense the intensity of the light in the field of view of the camera 10, and to thereby create a resistivity change in a circuit which is a function of the sensed light intensity. The photocell 22 is electrically coupled by conductors 24 to a galvanometer-type motor 26. The motor 26 is adapted to respond to the change in resistivity of the photocell 22 to rotate a drive axle 27 and a coupling member 28 through a distance which is a direct function of the light intensity of the field of view of the camera. As viewed in FIG. 2, the coupling member 28 carries a pin 29.

A first iris blade 30 is rigidly coupled to the axle 27 and is arranged to be pivotally driven about an axis through the axle 27 by the motor 26. A second driven iris blade 40 is positioned adjacent the first blade 30 and is pivotally mounted on an axle 41 provided in a camera 10. A slot 43 on the blade 40 engages with the pin 29 so that the movement of the crank arm 28 drives the blade 40 through a pin-and-slot connection. Accordingly, the blades 30 and 40 are scissor-type iris blades which will pivot about their respective pivot points 27 and 41 in response to the operation of the galvanometer motor 26. Since the motor 26 operates as a function of the light intensity as sensed by the photocell 22, the blades 30 and 40 will swing through a selected arc which is proportional to the sensed light intensity in the field of view of the camera 10.

Figure 2:
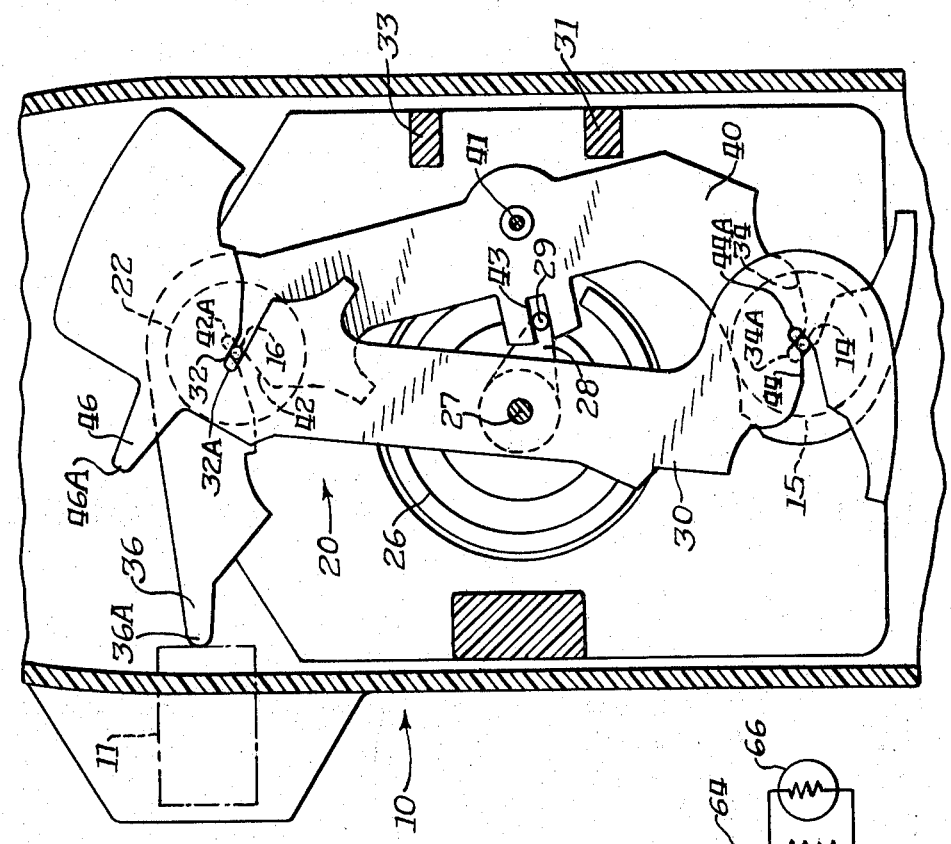
FIG. 2 is an enlarged cross-sectional view of the exposure control system taken along the line 2—2 in FIG. 1, illustrating the system in a minimum exposure area condition.

An end portion of the iris blades 30 and 40 define a pair of mating aperture slots 32 and 42, respectively. As indicated in FIG. 2, the aperture slots 32 and 42 are positioned to align with each other in front of the photocell 22 as the iris blades 30 and 40 pivot about their pivot points 27 and 41. The resulting area defined by the mating slots 32 and 42 is programmed so that the area of exposure of the photocell 22 changes in response to the quantity of light in the field of view, as sensed by the photocell. As the light intensity increases in the photocell 22, the photocell operates the motor 26 to pivot the blades 30 and 40 and cause the programmed exposure area of the mating slots 32 and 42 to diminish in size. The minimum area defined by the mating slots 32 and 42 occurs when the blades 30 and 40 reach a selected position designed to define the minimum exposure condition of the camera, such as illustrated by the position of the blades shown in FIG. 2.

As illustrated by a comparison of FIGS. 2 and 3, the photocell slots 32 and 42 are dimensioned and arranged so that the resulting area of the mating slots remains at the defined minimum area after the blades 30 and 40 have moved beyond the minimum light condition (FIG. 2), into a further over-exposed position (FIG. 3). A stop 31 provided in the camera engages with the blade 40 to define the extreme closed position for the blades. To accomplish such a function, the slots 32 and 42 taper to a minimum width and remain at that minimum width for an additional selected arcuate slot distance such as shown by the slot portions 32A and 42A. By this arrangement, the iris blades 30 and 40 can move with respect to each other beyond the minimum light condition illustrated in FIG. 2 to a further position, as illustrated in FIG. 3. The additional movement of the blades 30 and 40 does not close or restrict the opening to the photocell defined by the mating slots 32 and 42, but merely brings the additional slot portions 32A and 42A into mating relationship.

The additional length of slot portions 32 and 42 can be provided along an arcuate path having a center corresponding to the pivotal centers 27 and 41 of the iris blades 30 and 40, respectively. With that arrangement, the mating slots 32 and 42 will define a resultant aperture area which will remain centered along the axis 16 of the photocell 22. Alternatively, the additional length for the slot portions 32A and 42A can be arranged on the blades 30 and 40 so that the resulting photocell aperture formed by the mating slot portions 32A and 42A area is off-center from the axis 16 of the photocell 22. The shifting of the aperture off-center may be desirable to simplify the iris blade design in some circumstances, and will not adversely affect the operation of the camera if the shifting is not extreme, since the same quantity of light will reach the photocell 22 in either case. Under either alternative arrangement, the minimum aperture area will be established and maintained by the slot portions 32A and 42A as the blades 30 and 40 move a predetermined arc beyond the position defining the minimum aperture condition.

As illustrated in FIG. 4, the slots 32 and 42 also diverge as the blades 30 and 40 are separated to define an area equal to the maximum exposure area of the photocell 22. That divergent position for the blades 30 and 40 defines the maximum aperture condition for the photocell 22 in response to low light, under-exposure conditions in the field of view. The blades 30 and 40 can move further outward beyond this maximum divergent position without affecting the exposure area of the photocell 22, since the photocell area cannot be expanded beyond a maximum area defined by the size of the photocell. A stop 33 engages with the blade 40 to define the extreme diverged or open position for the iris blades.

The lower portions of the iris blades 30 and 40 define a second set of mating aperture slots 34 and 44. The area defined by these mating slots varies from a maximum exposure area, such as illustrated in FIG. 4, to a minimum exposure area such as illustrated in FIG. 2. In the maximum exposure condition, the area defined by the mating slots 34 and 44 is at least as large geometrically as the fixed aperture opening 15. The fixed aperture 15 thereby defines geometrically the effective maximum area of the mating slots through which a quantity of light can be transmitted through the lens system 12 of the camera 10. This maximum exposure condition occurs when the light sensed by the photocell 22 is low intensity light. As seen in FIG. 4, the blades 30 and 40 can swing further outwardly, to move the slots 34 and 44 beyond the fixed aperture 15, without affecting the size of the fixed aperture.

The aperture slots 34 and 44 are also designed to define geometrically the effective minimum aperture opening for the lens system 12. As illustrated in FIG. 2, the minimum aperture opening condition exists when the blades 30 and 40 are moved with respect to each other into a predetermined closed position. In such a position, the slots 34 and 44 cooperate to define geometrically the effective minimum area which will admit a predetermined minimum quantity of light through the fixed aperture 15 for impingement upon the film being exposed in the camera 10. The slots 34 and 44 in accordance with this invention are elongated by additional slot portions 34A and 44A to permit the iris blades 30 and 40 to move through a selected arc beyond the predetermined closed position, as shown in FIG. 2, without changing the resultant area of exposure defined by the mating slots.

The additional slot portions 34A and 44A also may be arranged along an arcuate path having a center corresponding to the pivotal centers 27 and 41 of the blades 30 and 40, respectively. The resultant aperture area defined by the mating slot portions 34A and 44A will remain centered along the axis 14 of the lens system 12 under that arrangement. Alternatively, the additional slot lengths 34A and 44A can be arranged on the blades 30 and 40 so that the resulting area formed by the mating slot portions is off-center from the lens axis 14. The shifting of the aperture defined by the slots 34A and 44A off-center will not affect the operation of the camera as long as the shifting is not extreme to the point of moving the aperture into the edges of the lens incorporated in the lens system 12. The quantity of light transmitted through the fixed aperture 15 will be the same under either alternative.

Further, in accordance with this invention, the iris blades 30 and 40 carry indicia means for registering the position of the iris blades and hence the exposure condition of the camera 10. In this regard, the iris blade 30 includes a projecting indicator tab 36 on its upper portion. Similarly, the iris blade 40 includes a projecting indicator tab 46 on its upper portion. The outer end 36A of the tab 36 has a square configuration and the outer end 46A of the tab 46 has a rounded configuration in the illustrated embodiment. As shown in FIG. 2, the tabs 36 and 46 are positioned on the blades 30 and 40 in alignment with the camera view finder 11. The tabs 36 and 46 also are dimensioned so as not to be visible in the view finder 11 as the blades 30 and 40 move between the selected maximum and minimum lighting positions. However, in accordance with this invention, the rounded end portion 36A of the tab 36 will project into the view finder 11, and will be clearly visible to the camera user, when the exposure control system operates to move the iris blades 30 and 40 beyond a minimum aperture area condition into an over-exposure condition, as shown in FIG. 3. Thus, the visibility of the tab portion 36A in the view finder 11 indicates to the camera user that an over-exposure condition exists, and that any picture that is taken will be of low quality and over-exposed. However, as will be noted from FIG. 3, this indicia of over-exposure is accomplished without shutting the camera aperture opening defined by the slot portions 34A and 44A along the optical axis 14. Thus, film can continue to be exposed and pictures can be taken, even though a high intensity lighting condition exists.

Similarly, the tab 46 is positioned on the blade 40 so that the square tab portion 46A projects inwardly into the view finder 11 when the iris blades 30 and 40 are moved by the exposure control system beyond the maximum exposure area position for the mating slots, such as illustrated in FIG. 4. Again, the indicia provided by the tab portion 46A is visible in the view finder 11 without interfering with the area of the aperture 15 along the optical axis 14. Hence, the camera user is informed of an under-exposure condition, but the camera is capable of exposing film and taking pictures, although the pictures are likely to be under-exposed. The different square or rounded ends of the tab portions 46A and 36A along the lighting conditions in the field of view, will indicate to the camera user whether an under-exposed or over-exposed condition exits.

Figure 5:
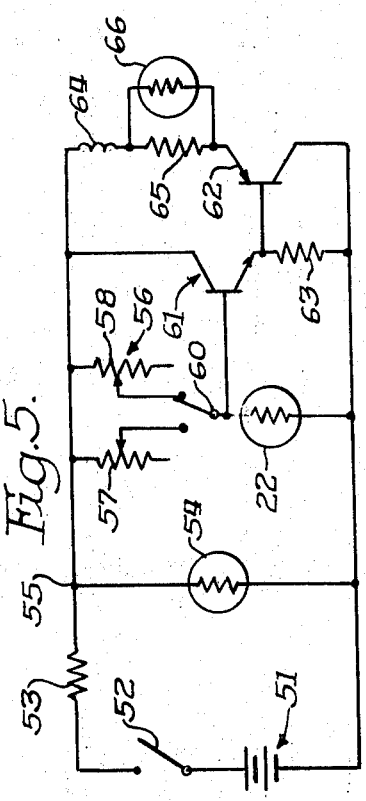
FIG. 5 is a schematic circuit diagram of the exposure control circuitry incorporated in the system of the present invention.

The circuitry for operating the exposure control system 20 in accordance with this invention is generally indicated by the reference numeral 50 in FIG. 5. The circuit 50 includes a power source in the form of a battery 51, which in one embodiment can be rated at about 6 volts. A safety switch 52 connects the battery 51 with the remainder of the circuit 50. The circuit 50 also includes a drop resistor 53 in series with the battery 51, and a voltage-dependent resistor 54 in parallel with the battery. The resistors 53 and 54 cooperate to supply a constant voltage signal to the junction 55. In one embodiment the resistor 53 is selected to be 11,000 ohms, and the system operates to maintain the junction point 55 at a constant 1.2 volts.

The circuit 50 further includes the photocell 22 which is photo-resistant and which diminishes in electrical resistivity as the sensed light intensity increases. The photocell 22 is in series with an ASA film rating switching system 56. The switching system 56 includes low and high ohm potentiometers 57 and 58, which are set to supply a selected reference voltage to a reference point 60. A switch 59 permits the camera user to switch between the potentiometers 57 and 58. When the switch 59 is in the high position H, the circuit 50 is programmed for operating with black and white film in the camera 10. Correspondingly, in the low position L the switch 59 programs the circuit to operate with color film.

The circuit 50 also includes a pair of transistors 61 and 62 arranged as an emitter-follower current amplifier. A resistor 63 is provided between the photocell 22 and the transistors 61 and 62, and is selected to maintain the voltage at the bases of the two transistors 61 and 62 substantially the same as the reference voltage at the reference point 60. The second transistor 62 is coupled with a coil 64 of a galvanometer drive motor. A temperature-compensating network, comprising a resistor 65 and a thermister 66 connected in parallel, is provided to minimize the effect of temperature changes on the function of the meter coil 64.

Accordingly, the circuit 50 operates so that the system tends to return the base of the first transistor 61 to the set point or reference voltage established when the circuit is calibrated for either a black and white or color (high or low) setting. If the voltage across the transistors 61 and 62 change from that reference voltage, the meter 64 is deflected, and tends to close the aperture defined by the slots 32 and 42 in front of the photocell 22. The light intensity on the photocell is hence continually reduced until the reference point 60 has returned to the reference voltage for the particular camera setting (black and white or color). The circuit 50 will operate to tend to balance the closure control system as long as the light conditions are such that the iris blades 30 and 40 are maintained between a range defining the minimum and maximum conditions for which the camera 10 is calibrated. If that condition is exceeded, by either an extremely intense light or a lack of light, the resistance of the photocell 22 will change and unbalance the system. The circuit 50 will deflect the meter 64 in an attempt to balance the circuit by closing off the light of the photocell 22. However, the dimensions of the slot portions 32A and 42A beyond the normal positions of the blades maintain a constant aperture area, and thereby preclude a change in the light intensity to the photocell 22. Accordingly the exposure system will remain out of balance beyond the minimum or maximum light conditions and the iris blades 30 and 40 will be positively driven and maintained in an unstable condition until engagement with the stops 31 or 33. In the unstable condition, at either extreme of the light spectrum, the indicia tabs 36 and 46 will be positively driven into the viewer 11. Simultaneously, the aperture 15 will remain opened so that film can be exposed and pictures taken, even though unusual, extreme lighting conditions exist.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. A system for controlling and indicating the exposure condition of film in a photographic camera comprising:

an exposure meter having light-sensing means and drive means coupled to move said drive means in relation to the intensity of light in the field of view of the camera;

a lens system defining an optical axis for the camera;

a pair of iris blade means coupled to said drive means and movable across said optical axis between first and second selected positions to thereby control the quantity of light to which said film is exposed through said lens system;

aperture means defined by said blade means in optical alignment with said lens system and having a configuration which varies to define a selected minimum effective aperture exposure area for said lens system with said blade means in said first position and a selected maximum effective aperture exposure area with said blade means in said second position; said aperture means being configured to maintain substantially the same minimum effective aperture exposure area as said meter drive means moves said blade means a predetermined distance beyond said first position and further being arranged to maintain said maximum effective aperture exposure area as said meter drive means moves said blade means a predetermined distance beyond said second position; and indicia means coupled to said blade means and arranged to register over-exposure indicia when said blade means moves beyond said first position and under-exposure indicia when said blade means moves beyond said second position;

whereby the system permits exposure of the film through said lens system under extreme over-exposed and under-exposed lighting conditions while indicating the over-exposed and under-exposed condition to the camera user.

2. The exposure control system in accordance with claim 1 wherein said aperture means is arranged to maintain the center of said effective minimum and maximum exposure areas aligned with said optical axis so that the exposure of the film occurs through the central position of said lens system.

3. The exposure control system in accordance with Claim 1 wherein said aperture means is arranged to maintain the center of said effective minimum exposure aperture area aligned with said optical axis as said blade means moves between said first and second positions and further shifts said aperture area from said optical center as said blade means moves said predetermined distance beyond said first position.

4. The exposure control system in accordance with Claim 1 wherein said exposure meter comprises a variable resistance photocell and a galvanometer drive motor connected to said iris blade means, with said blade means including second aperture means positioned to vary the light sensed by said photocell as said blade means moves across said optical axis, and further wherein said meter includes balancing circuitry coupling said photocell and drive motor adapted to react to the resistance of said photocell to drive said motor and blade means to a null position.

5. The exposure control system in accordance with claim 4 wherein said iris blade means comprises a pivoted driving iris blade connected to said drive motor and a pivoted driven iris blade connected to said driving blade, and wherein said first aperture means comprises a first pair of mating slots in said blades movable across said optical axis to selectively vary the effective exposure area of the film and said second aperture means comprises a second pair of mating slots in said blades movable across said photocell to selectively vary the light sensed by the photocell and thereby balance said motor and blades to said null position.

6. A system for controlling and indicating the exposure condition of film in a photographic camera comprising:

an exposure meter including a variable resistance photocell and a galvanometer drive motor electrically coupled by balancing circuitry adapted to react to the resistance of said photocell to drive said motor to a null position;

a lens system defining an optical axis for the camera;

a pair of iris blade means coupled to said drive motor and including a first aperture arranged for movement across said optical axis between first and second selected positions and having a varying area adapted to selectively vary the light exposure of the film from a minimum effective exposure area in said first position to a maximum effective exposure area in said second position, said blade means further including a second aperture arranged for movement across said photocell and having a selected area which varies the light sensed by said photocell and thereby drives said motor toward said null position;

said first aperture being arranged to maintain the same minimum effective aperture exposure area as said blade means moves across said optical axis a predetermined distance beyond said first position, and further being arranged to maintain substantially the same maximum effective aperture exposure area as said blade means moves across said optical axis a predetermined distance beyond said second position, and further wherein said second aperture is arranged to present said photocell with a substantially constant area of exposure as said blade means moves said predetermined distance beyond said first and second positions, so that extreme lighting conditions unbalance said meter circuitry and cause said drive motor to move said blade means beyond said first and second positions;

first indicia means coupled to one of said blade means and arranged to register over-exposure indicia when said pair of blade means moves beyond said first position and second indicia means coupled to the other of said blade means and arranged to register under-exposure indicia when said blade means moves beyond said second position;

whereby the system permits exposure of the film through said lens system under extreme lighting conditions while indicating the exposure conditions to the camera user.

7. In a camera having a lens system defining an optical axis, a viewfinder and an exposure meter having light sensing means and drive means coupled to move said drive means in relation to the intensity of light in the field of view of the camera, the improvement comprising a system which indicates the existance of an over-exposure condition for the camera and permits continued film exposure after said over-exposure condition has occurred, said system comprising:

iris blade means coupled to said drive means and movable in a selected direction across said optical axis to control the quantity of light to which the film in the camera is exposed through said lens system;

aperture means provided in said blade means defining a minimum effective aperture exposure area for said lens system in alignment with said optical axis;

slot means provided on said blade means optically coupled to said aperture means and arranged to maintain substantially the same effective aperture exposure area for said camera as said blade means is driven in said direction a selected distance beyond said minimum exposure area by said drive means; and indicia means coupled to said blade means and arranged to register over-exposure indicia within said viewfinder when said blade means is moved in said direction by said drive means beyond said alignment of said minimum aperture area with said optical axis;

whereby said system indicates the existance of an over-exposure condition for said camera while permitting continued film exposure under such over-exposed lighting conditions.

* * * * *